United States Patent
Penning et al.

(10) Patent No.: US 11,226,621 B2
(45) Date of Patent: Jan. 18, 2022

(54) METHOD FOR OPTIMIZATION OF ROBOTIC TRANSPORTATION SYSTEMS

(71) Applicant: Teradyne, Inc., North Reading, MA (US)

(72) Inventors: Ryan S. Penning, Madison, WI (US); James D. English, Alva, FL (US); Douglas E. Barker, Somerville, MA (US); Brett L. Limone, Danvers, MA (US); Paul Muench, Livonia, MI (US)

(73) Assignee: TERADYNE, INC., North Reading, MA (US)

( * ) Notice: Subject to any disclaimer, the term of this patent is extended or adjusted under 35 U.S.C. 154(b) by 477 days.

(21) Appl. No.: 16/275,431

(22) Filed: Feb. 14, 2019

(65) Prior Publication Data

US 2020/0081434 A1 Mar. 12, 2020

Related U.S. Application Data

(60) Provisional application No. 62/630,769, filed on Feb. 14, 2018.

(51) Int. Cl.
| | | |
|---|---|---|
| *G05D 1/00* | (2006.01) | |
| *G05B 17/02* | (2006.01) | |
| *B25J 11/00* | (2006.01) | |
| *G06N 10/00* | (2019.01) | |

(52) U.S. Cl.
CPC ............ *G05D 1/0088* (2013.01); *B25J 11/00* (2013.01); *G05B 17/02* (2013.01); *G06N 10/00* (2019.01); *G05D 2201/0217* (2013.01)

(58) Field of Classification Search
CPC .................................................. G05D 1/0088
See application file for complete search history.

(56) References Cited

U.S. PATENT DOCUMENTS

| | | | |
|---|---|---|---|
| 6,757,587 B1 | 6/2004 | English et al. | |
| 7,680,300 B2 | 3/2010 | Chang et al. | |
| 8,301,421 B2 | 10/2012 | Bacon et al. | |
| 8,408,918 B2 | 4/2013 | Hu et al. | |
| 8,428,781 B2 | 4/2013 | Chang et al. | |
| 8,554,370 B2 * | 10/2013 | Goswami ............. | B62D 57/032 700/253 |
| 9,357,708 B2 | 6/2016 | Chang et al. | |
| 10,248,085 B2 * | 4/2019 | Ha ........................ | G05B 11/01 |

(Continued)

FOREIGN PATENT DOCUMENTS

CN 104325462 A * 2/2015

*Primary Examiner* — Shelley Chen
(74) *Attorney, Agent, or Firm* — Mark H. Whittenberger; Holland & Knight LLP

(57) ABSTRACT

Embodiments included herein are directed towards a robotic system and method. Embodiments may include a transportation mechanism having at least three legs and a computing device configured to receive a plurality of optimization components. Each optimization component may include a plurality of variables and the computing device may be further configured to perform a randomized simulation based upon, at least in part, each of the plurality of optimization components. The computing device may be further configured to provide one or more results of the randomized simulation to the transportation mechanism to enable locomotion via the at least three legs.

21 Claims, 12 Drawing Sheets

(56) References Cited

U.S. PATENT DOCUMENTS

| | | | |
|---|---|---|---|
| 2003/0009259 A1* | 1/2003 | Hattori | B62D 57/032 |
| | | | 700/245 |
| 2004/0195767 A1* | 10/2004 | Randall | A63F 3/00643 |
| | | | 273/237 |
| 2010/0292838 A1* | 11/2010 | Goswami | B25J 9/163 |
| | | | 700/246 |
| 2015/0199458 A1 | 7/2015 | Bacon et al. | |
| 2016/0321381 A1 | 11/2016 | English et al. | |
| 2018/0060459 A1 | 3/2018 | English et al. | |
| 2018/0107175 A1* | 4/2018 | Ha | B25J 9/1656 |
| 2018/0333855 A1* | 11/2018 | Moses | B25J 9/162 |
| 2020/0276704 A1* | 9/2020 | Sindhwani | B25J 9/1661 |

\* cited by examiner

METHOD FOR OPTIMIZATION OF ROBOTIC TRANSPORTATION SYSTEMS

CROSS-REFERENCE TO RELATED APPLICATIONS

This application claims the benefit of U.S. Provisional Application having Ser. No. 62/630,769 filed on Feb. 14, 2018, the entire contents of which are incorporated herein by reference in their entirety.

The U.S. Government has a paid-up license in this invention and the right in limited circumstances to require the patent owner to license others on reasonable terms as provided for by the terms of contract No. W56HZV-15-C-0171 awarded by the Department of Defense. The government has certain rights in the invention.

TECHNICAL FIELD

The present disclosure generally relates to robotics and more specifically to optimizing a robotic transportation system.

BACKGROUND

Robotic systems are increasingly called upon to perform ever more complicated types of tasks. Such tasks often require complex coordination amongst various elements of a robotic system. However, coordinating control amongst several robotic elements (e.g., a moving arm, tool attached to the arm, mobile base, legs, and so on) has proven difficult and remains computationally intensive. Some have developed single degree of freedom mechanisms that can reproduce walking-type gaits. To date, these have primarily been used for art and performance applications.

SUMMARY

In one or more embodiments of the present disclosure, a robotic system is provided. The system may include a transportation mechanism having at least three legs and a computing device configured to receive a plurality of optimization components. Each optimization component may include a plurality of variables, wherein the computing device is further configured to perform a randomized simulation based upon, at least in part, each of the plurality of optimization components. The computing device may be further configured to provide one or more results of the randomized simulation to the transportation mechanism to enable locomotion via the at least three legs.

One or more of the following features may be included. In some embodiments, the randomized simulation may be performed prior to locomotion of the transportation mechanism. The randomized simulation may be performed during locomotion of the transportation mechanism. The at least three legs may be configured to contact the ground along a single line. The at least three legs may include at least one of a Klann linkage and a Jansen linkage. The computing device may include a control system that may be optimized in real-time based on terrain information that is known a priori or sensed in real time. The computing device may include a quantum computer configured to perform at least a portion of the randomized simulation. In some embodiments, locomotion may include a walking-style gait controlled by a single degree of freedom shared between two or more of the at least three legs. The computing device may be configured to control balance of the transportation mechanism using an actively actuated hydraulic, pneumatic or electromechanical control system. The transportation mechanism may include at least one of a vehicle, a legged robot, and a mobile robot.

In another embodiment of the present disclosure, a robotic method is provided. The method may include providing a transportation mechanism having at least three legs and receiving, at a computing device, a plurality of optimization components each including a plurality of variables. The method may include performing, using the computing device, a randomized simulation based upon, at least in part, each of the plurality of optimization components. The method may also include providing one or more results of the randomized simulation to the transportation mechanism to enable locomotion via the at least three legs.

One or more of the following features may be included. In some embodiments, the randomized simulation may be performed prior to locomotion of the transportation mechanism. The randomized simulation may be performed during locomotion of the transportation mechanism. The at least three legs may be configured to contact the ground along a single line. The at least three legs may include at least one of a Klann linkage and a Jansen linkage. The method may include optimizing a control system in real-time based on terrain information that is known a priori or sensed in real-time. The method may further include performing at least a portion of the randomized simulation using a quantum computer. In some embodiments, locomotion may include a walking-style gait controlled by a single degree of freedom shared between two or more of the at least three legs. The method may include balancing the transportation mechanism using an actively actuated hydraulic, pneumatic or electromechanical control system. The transportation mechanism may include at least one of a vehicle, a legged robot, and a mobile robot. The transportation mechanism may also include a mobile bin-picking robot.

BRIEF DESCRIPTION OF THE DRAWINGS

For a better understanding of the nature and objects of the present disclosure, reference is made to the following detailed description taken in conjunction with the following drawings, in which.

DETAILED DESCRIPTION

Embodiments included herein are directed towards a system and method for optimization of a robotic transportation system. Embodiments may include a robotic device having a plurality of legs that use a walking-style gait for locomotion. The robotic optimization process described herein may be configured to optimize one or more statistics found through a randomized simulation methodology in order to enable such locomotion.

Embodiments of the subject application may include concepts from U.S. Pat. Nos. 6,757,587, 7,680,300, 8,301,421, 8,408,918, 8,428,781, 9,357,708, U.S. Publication No. 2015/0199458, U.S. Publication No. 2016/0321381, and U.S. Publication No. 2018/0060459, the entire contents of each are incorporated herein by reference in their entirety.

Figure 1:
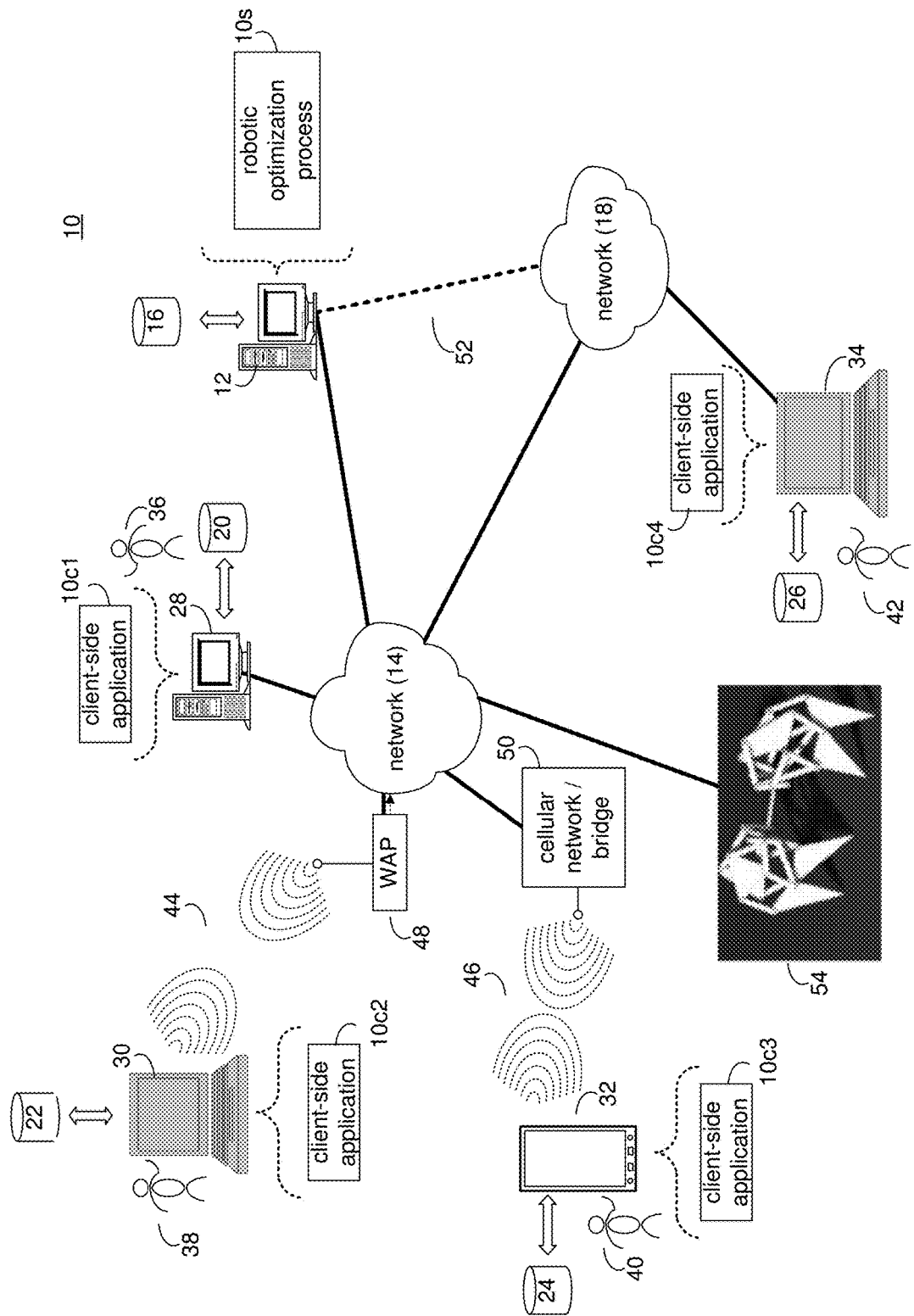
FIG. 1 is a system diagram, according to an embodiment of the present disclosure.

Referring to FIG. 1, there is shown a robotic optimization process 10 for optimizing and simulating a robotic device. For the following discussion, it is intended to be understood that robotic optimization process 10 may be implemented in a variety of ways. For example, robotic optimization process 10 may be implemented as a server-side process, a client-side process, or a hybrid server-side/client-side process.

For example, robotic optimization process 10 may be implemented as a purely server-side process via robotic optimization process 10s. Alternatively, robotic optimization process 10 may be implemented as a purely client-side process via one or more of client-side application 10c1, client-side application 10c2, client-side application 10c3, and client-side application 10c4. Alternatively still, robotic optimization process 10 may be implemented as a server-side/client-side process via screen robotic optimization process 10s in combination with one or more of client-side application 10c1, client-side application 10c2, client-side application 10c3, and client-side application 10c4. In such an example, at least a portion of the functionality of robotic optimization process 10 may be performed by robotic optimization process 10s and at least a portion of the functionality of robotic optimization process 10 may be performed by one or more of client-side application 10c1, 10c2, 10c3, and 10c4.

Accordingly, robotic optimization process 10 as used in disclosure may include any combination of robotic optimization process 10s, client-side application 10c1, client-side application 10c2, client-side application 10c3, and client-side application 10c4.

Robotic optimization process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of robotic optimization process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to an application incorporated into and executed within a client-side process incorporated into and executed with a client-side media applications, a web browser, media decoder, such as, audio and video decoders. It is understood that the aforementioned may be incorporated into a mobile device platform. The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access robotic optimization process 10 directly through network 14 or through secondary network 18. Further, screen capture process 10 may be accessed through secondary network 18 via link line 52. Robotic optimization process 10 may access a robotic device (e.g., robotic device 54) through network 14 by one or more of the users (e.g., Users 36, 38, 40, 42).

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 44 established between laptop computer 30 and wireless access point (WAP) 48. Similarly, mobile computing device 32 is shown wireles sly coupled to network 14 via wireless communication channel 46 established between mobile computing device 32 and cellular network/bridge 50, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

Figure 2:
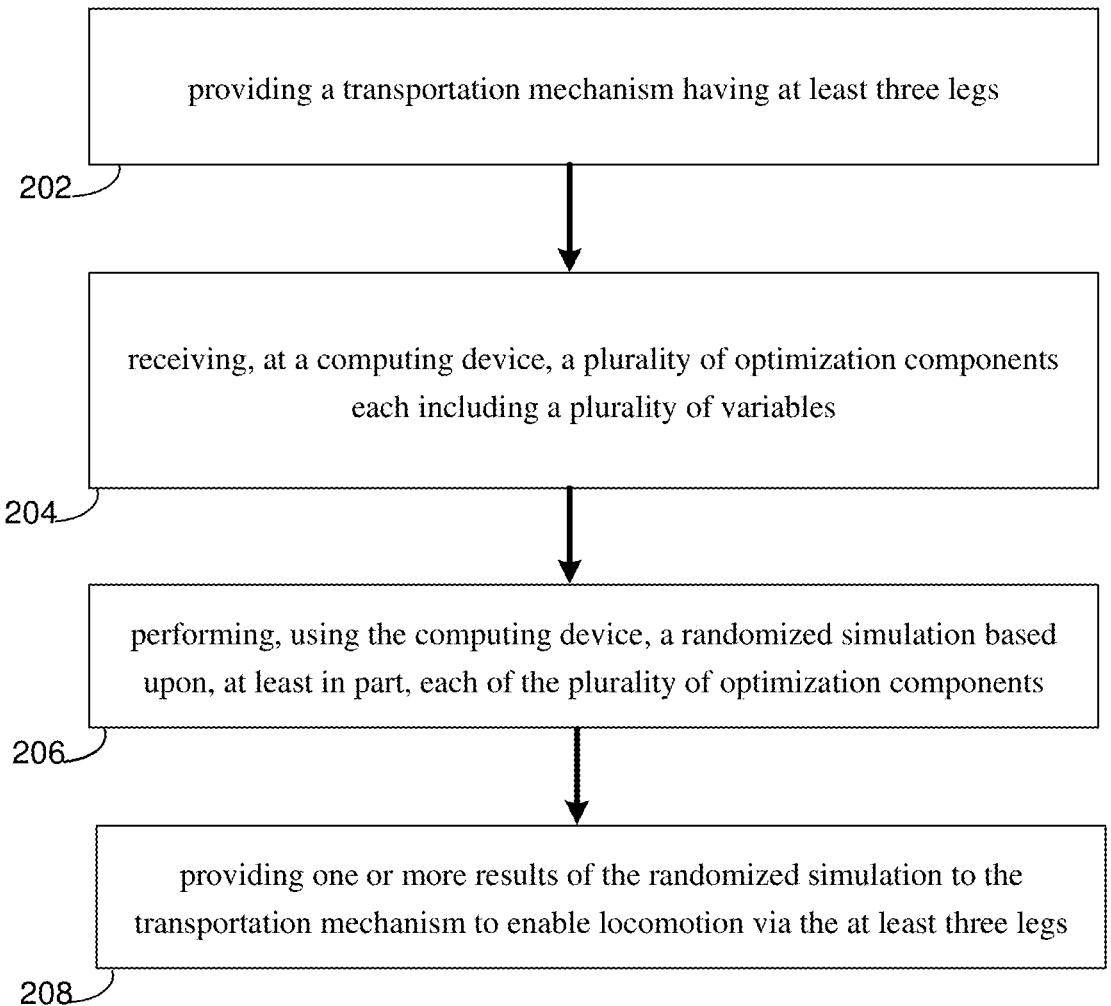
FIG. 2 is a flowchart of a robotic process, according to an embodiment of the present disclosure.

Referring also to FIG. 2, and as will be discussed in greater detail below, robotic optimization process 10, may provide (202) a transportation mechanism having at least three legs and may receive (204), at a computing device, a plurality of optimization components each including a plurality of variables. Robotic optimization process 10 may perform (206), using the computing device, a randomized simulation based upon, at least in part, each of the plurality of optimization components and may provide (208) one or more results of the randomized simulation to the transportation mechanism to enable locomotion via the at least three legs.

Figure 3:
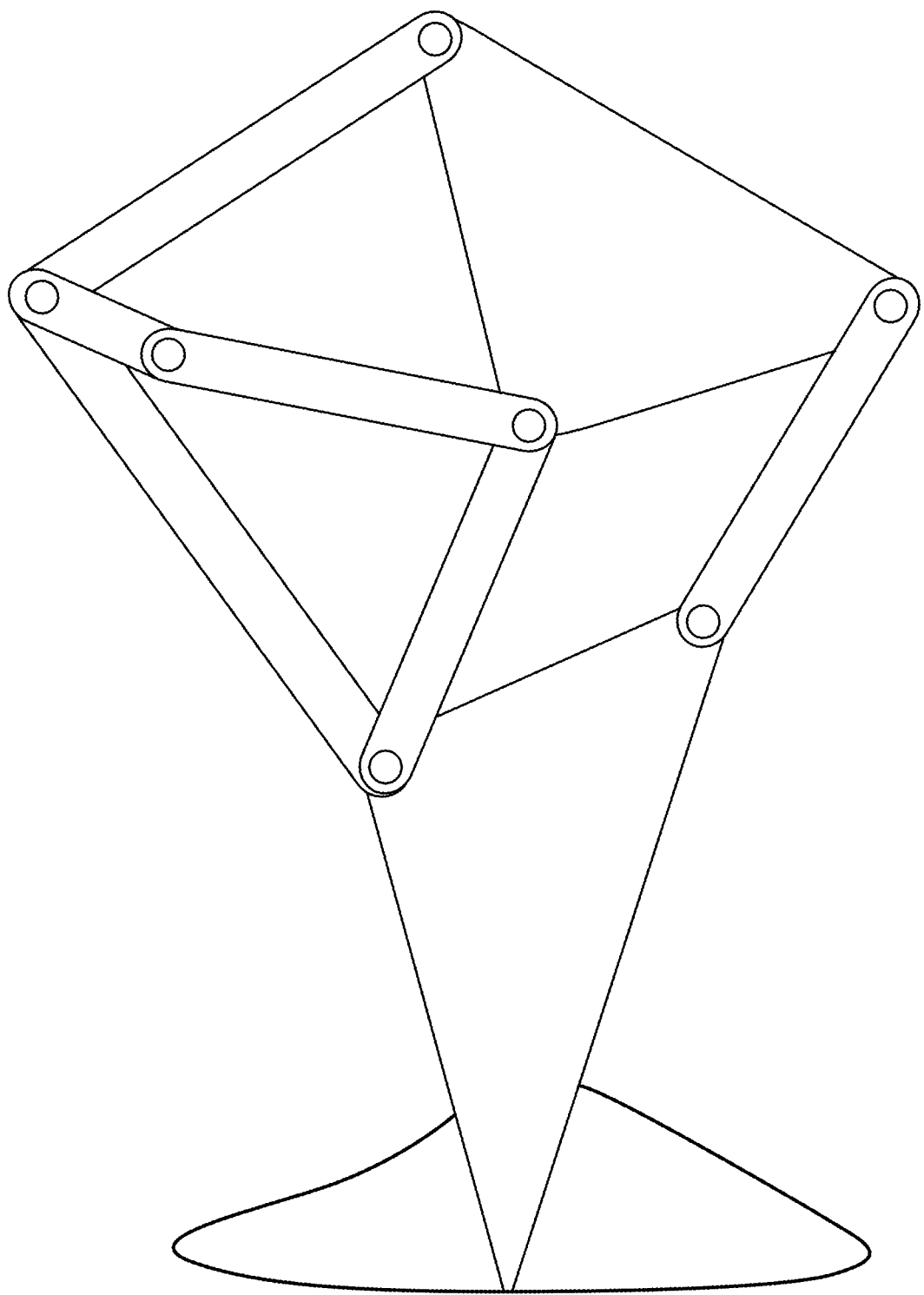
FIG. 3 is an example of a walking mechanism, according to an embodiment of the present disclosure.
Figure 4:
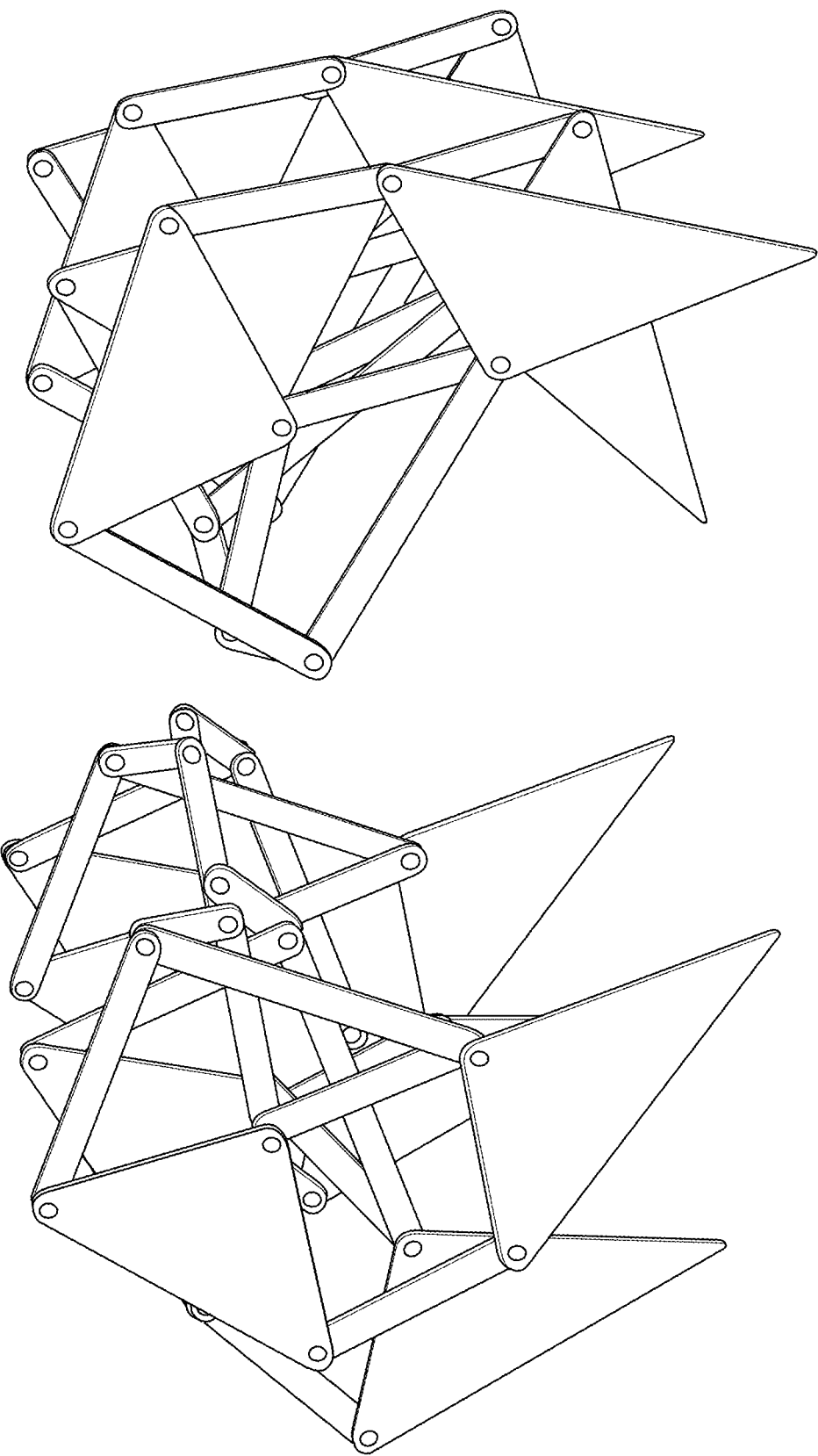
FIG. 4 is another example of a walking mechanism, according to an embodiment of the present disclosure.

In some embodiments, and referring now to FIGS. 3-4, robotic optimization process 10 may operate with any number of different robotic devices. FIG. 3 shows an example of a Jansen walking mechanism, which may operate as a single degree of freedom (1-DoF) mechanism that may be configured to reproduce a walking-type gait. Each leg in this mechanism may take a single rotational input, which may then drive a set of interconnected links. This results in a triangular path made at the tip of the foot as illustrated in FIG. 3. The central 'crank' link moves in circles as it may be actuated by a rotary actuator such as an electric motor. All other links and pin joints may be unactuated and move because of the motion imparted by the crank. Their positions and orientations may be uniquely defined by specifying the crank angle and hence the mechanism has only 1-DoF. Various configurations of the Jansen mechanism are also possible, some of which may include, but are not limited to, a 2-DoF "human" walker, as well as a 4 leg, 2-DoF walker, and an 8 leg, 4-DoF walker as is shown in FIG. 4. The legs and various portions of the mechanism may be constructed from rigid material, flexible materials, or a combination thereof.

Figure 5:
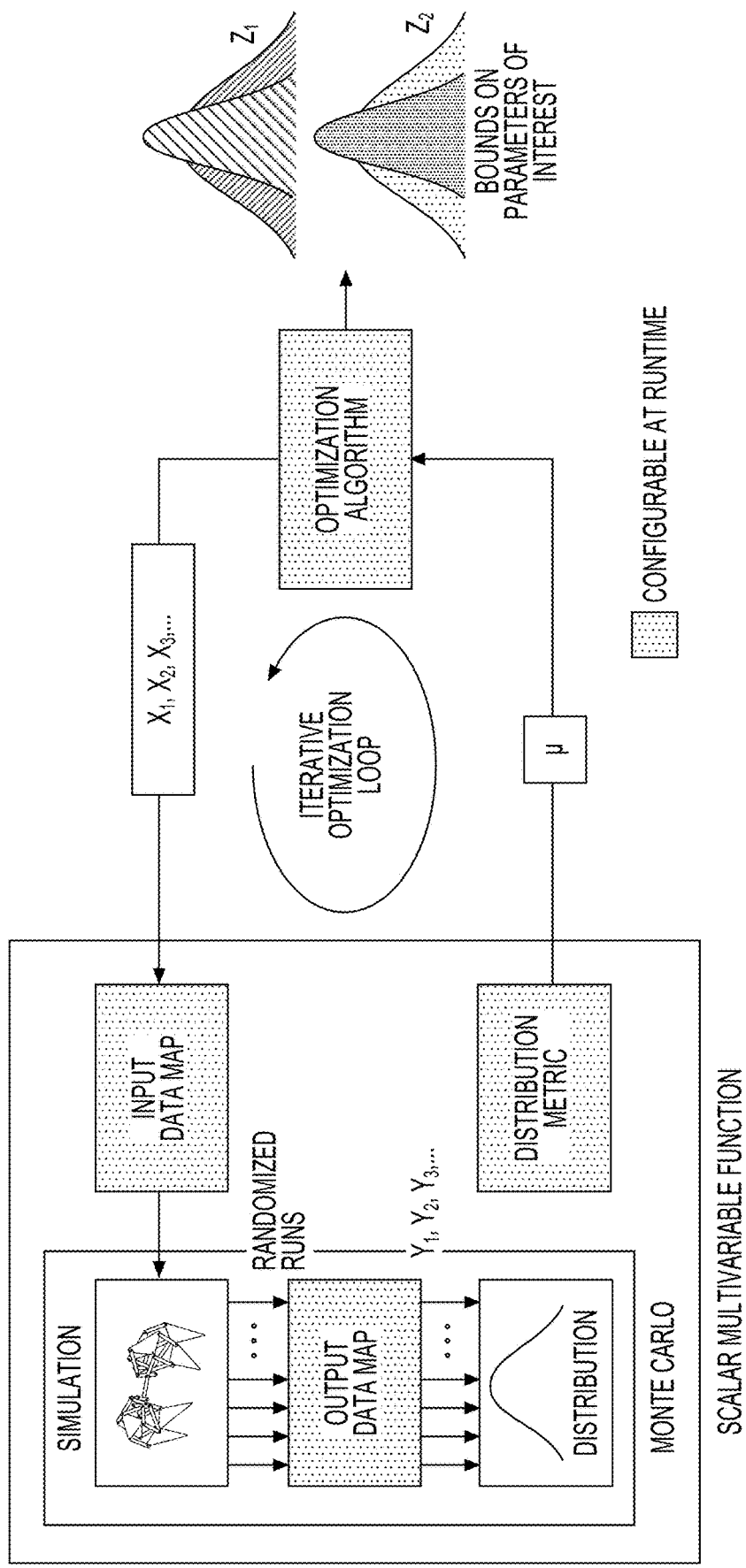
FIG. 5 is a diagram of a robotic architecture, according to an embodiment of the present disclosure.

Referring now to FIG. 5, an embodiment showing an example architecture that may be used in accordance with robotic optimization process 10 is provided. In some embodiments, robotic optimization process 10 may include Monte Carlo simulation and/or other randomization techniques. Randomization may be used to estimate uncertainties and Monte Carlo, more specifically, may use randomization to solve deterministic problems. For use with simulation, Monte Carlo methods typically take probability distribution functions for input parameters (e.g., mass properties, friction, sensor noise, etc.) and calculate probability distribution functions for output parameters. For example, Monte Carlo simulation may be configured to convert probability distributions of terrain slope into probability of successful vehicle navigation. Monte Carlo simulation is powerful because simulation without randomization is inaccurate. It is never possible to precisely capture and simulate a real-world parameter. Weight is always a little different, friction a little different, lengths a little different. Temperature alone changes physical parameters. Accordingly, Monte Carlo simulation may capture a range of values that contain true values. The parameters for any real scenario may all lie within the probability distributions of a correctly configured Monte Carlo simulation.

In some embodiments, robotic optimization process 10 may utilize one or more numerical optimization techniques. Numerical optimization may be used for both control and analysis. For control, it may enable the calculation of the best inputs to the system to achieve a desired outcome. Minimizing travel time or distance traversed is used widely and regularly, for example. Optimization may produce algorithms that drive engines, communications, and autopilots. For analysis, optimization may provide perspective on how well or poorly a system can possibly perform. It allows the potential of a system to be measured and improved, and it can be used to find flaws. A design of a modern vehicle requires analyses to be performed on the many components use in choosing shape, size, structure, materials properties, and placements.

In some embodiments, robotic optimization process 10 may utilize a randomizing optimizing simulation to capture the capabilities of both Monte Carlo simulation and numerical optimization. In some embodiments, a metric based on output statistics from multiple Monte Carlo analyses may be optimized over a set of domain values (that can represent either unknowns or design parameters). The approach shown in FIG. 5, for example, may randomize one metric on a distribution over one set of variables.

In some embodiments, for any randomizing-optimizing run, there may be various sets of data. Some of these data types may include, but are not limited to, fixed a priori information, domain values, random variables, result values, etc. The fixed a priori information may remain the same over all simulation runs. For a single simulation, robotic optimization process 10 may fix the domain values. Multiple runs with pseudorandom selections for the random variables may be performed. From these multiple runs, statistics on the result values may be calculated and measured (with a scalar metric). This process may be viewed as a scalar multivariable function with the domain values as input and the measurement of the result statistics as the output. This function may be optimized (minimum or maximum equally fits) using established methods (such as the Nelder-Mead algorithm) over the domain values.

In some embodiments, friction, for example, could fall within any of the aforementioned data sets. If part of the fixed a priori information data set, friction may be known precisely and we would be inquiring into behavior with that friction value present. If part of the domain values data set, the process may analyze the effect of unknown friction and, for example, determine any friction values that produce anomalous behavior. If part of the random variables data set, friction may be determined through its statistics, and the process may analyze the effect of some other parameter on behavior within this friction environment.

In some embodiments, a distinction may be made between multiple levels of knowledge about a parameter. In some cases, it may be possible to know its value, its statistical distribution, or not even know its statistical distribution. If a parameter's value is known, it may be included with the fixed information. If its statistics are known, it is a random variable. And, if its statistical distribution is not even known, it becomes a domain value. The randomizing-optimizing framework described herein may accommodate all levels of knowledge.

In some embodiments, the architecture shown in FIG. 5 may be extended to optimize across multiple (possibly intentionally conflicting) relevant metrics focused on a gait motion simulation. The result will be capable of handling unknown and uncertain parameters, and driver and algorithmic models that can adapt and evolve in reaction to changing conditions. This multi-optimization approach associated with robotic optimization process 10 may include controlling one or more transitions among a set of P optimizations. Each optimization addresses a different system-relevant metric over a different subset of the state, using as the other part of the state the results from the previous optimization. It should be noted that aspects of robotic optimization process 10 may be performed by one or more quantum computing devices. In some embodiments, the qubits in the quantum computer may represent simulation variables with known probability distributions or variables with partially know or unknown probability distributions, with quantum entanglement of the qubits reflecting variable correlation in the simulation.

Figure 6:
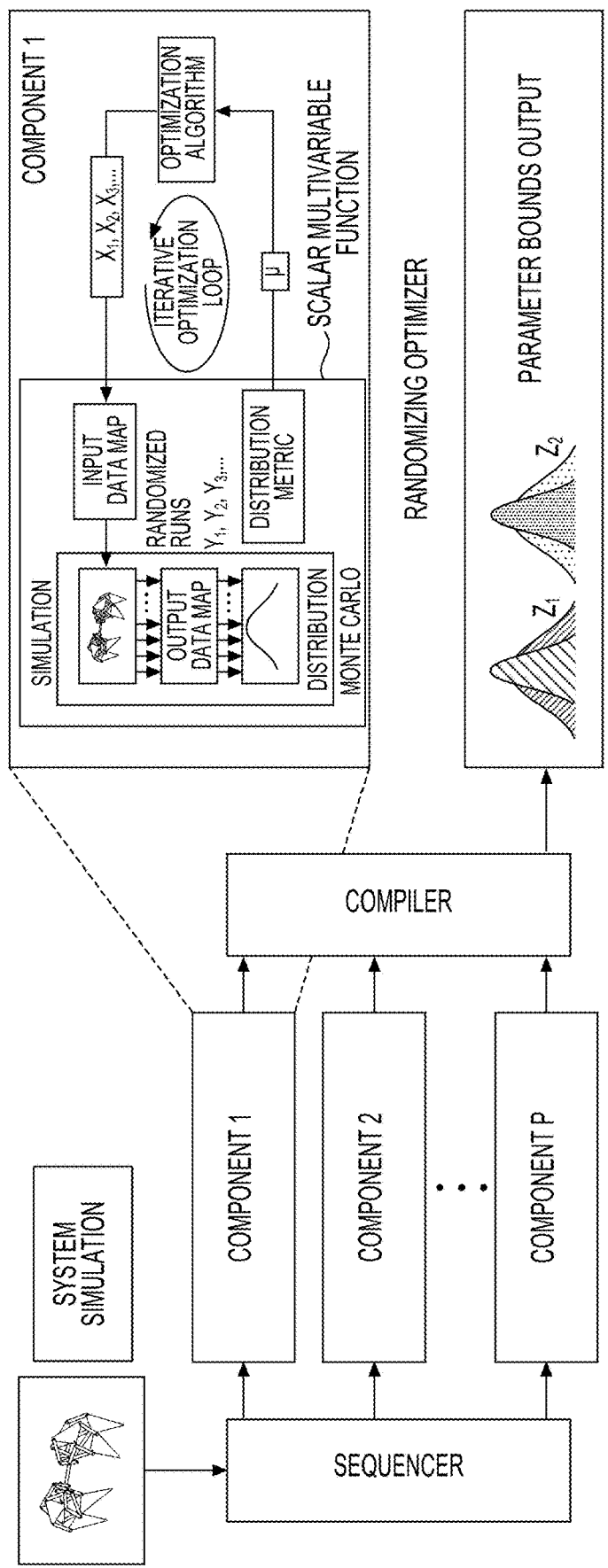
FIG. 6 is a diagram of a robotic architecture, according to an embodiment of the present disclosure.

Referring also to FIG. 6, an embodiment showing a multi-optimization architecture associated with robotic optimization process 10 is provided. FIG. 6 combines the randomizing-optimizing concept of FIG. 5 to provide an example multi-optimization architecture. It should be noted that the starting architecture shown in FIG. 5 is one configuration of this more general architecture, found by using P=1 components. In some embodiments, a sequencer (e.g. a dedicated software module) and a compiler may be configured to manage execution of the components and to compile the results. Each optimization component may be a full randomizing-optimizer as illustrated through the expansion of component 1 in FIG. 6. Similarly, the compiler shown in FIG. 6 may use the results of the optimizations to formulate a comprehensive result. A simple compiler may provide the last result, and a sophisticated algorithm may integrate multiple results, which may be important when the optimization domain is shared and there is not a single value of convergence. In some embodiments, if the optimization domain is shared, there is no guarantee of equilibrium, and a mean or bounds on optimization results from the sequenced components may contribute to the final results.

In some embodiments, robotic optimization process 10 may utilize multi-optimization to identify a compromise between competing goals. Accordingly, the process may accommodate the ability of an agent (either human or algorithm) in the environment to adapt and change. This approach is inspired by game theory where multiple agents seek disparate goals. With this architecture, each metric may be optimized using the knowledge of optimal strategy found for the other metrics. There is no natural order in sequencing the optimization components, and the execution may be controlled by the sequencer, as shown in FIG. 6.

In some embodiments, the sequencer may walk through the components, while a more sophisticated algorithm may select components with the maximum change effect. The sequencer may share the same simulation and state across the randomizing-optimizing components, but may change the optimization algorithms used by the components.

Figure 7:
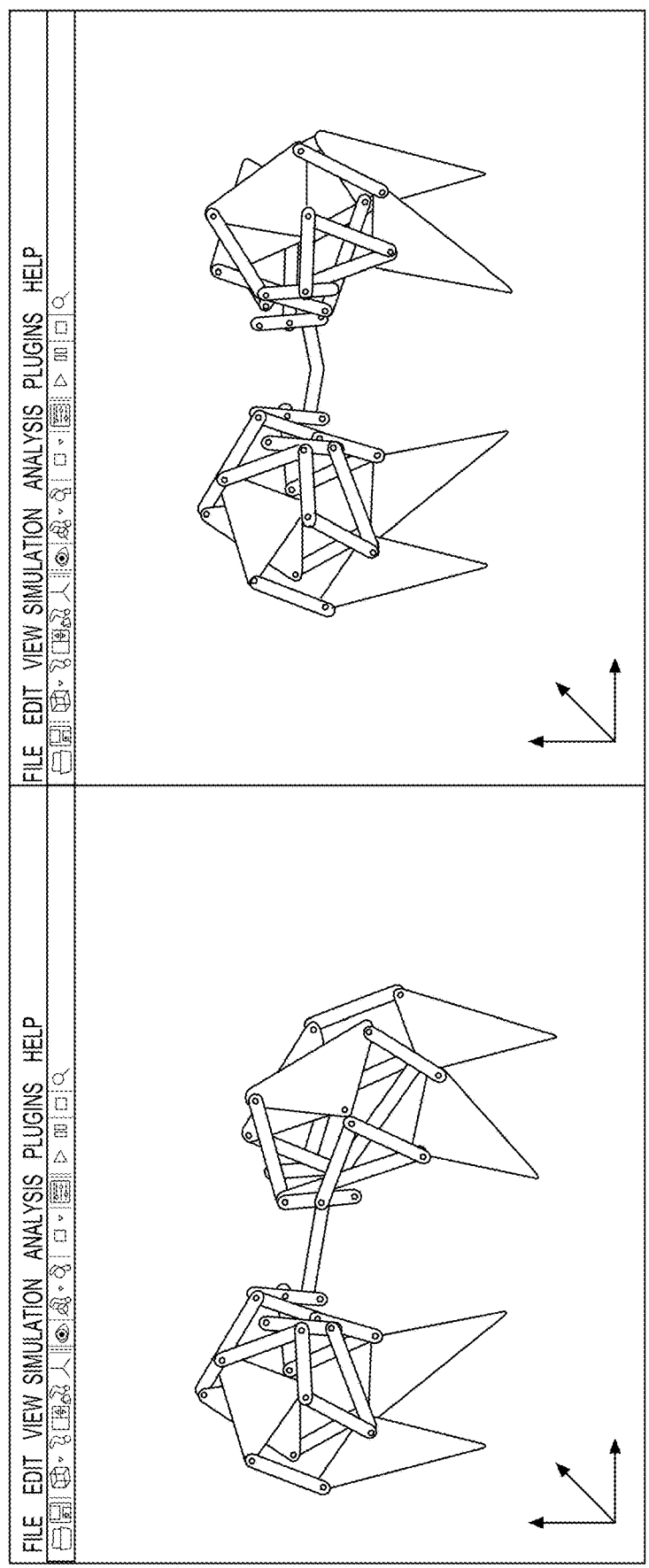
FIG. 7 is a graphical user interface depicting an example of a robotic model, according to an embodiment of the present disclosure.

Referring now to FIG. 7, an embodiment showing a graphical user interface configured to show an example of a planar Jensen mechanism model is provided. This system includes three total degrees of freedom, for example, one each driving the front and rear set of legs, and one for an articulated joint in the middle used for both steering and stability. The remaining joints may be constrained by the interconnections of the Jansen mechanism, and cannot be independently articulated.

Figure 8:
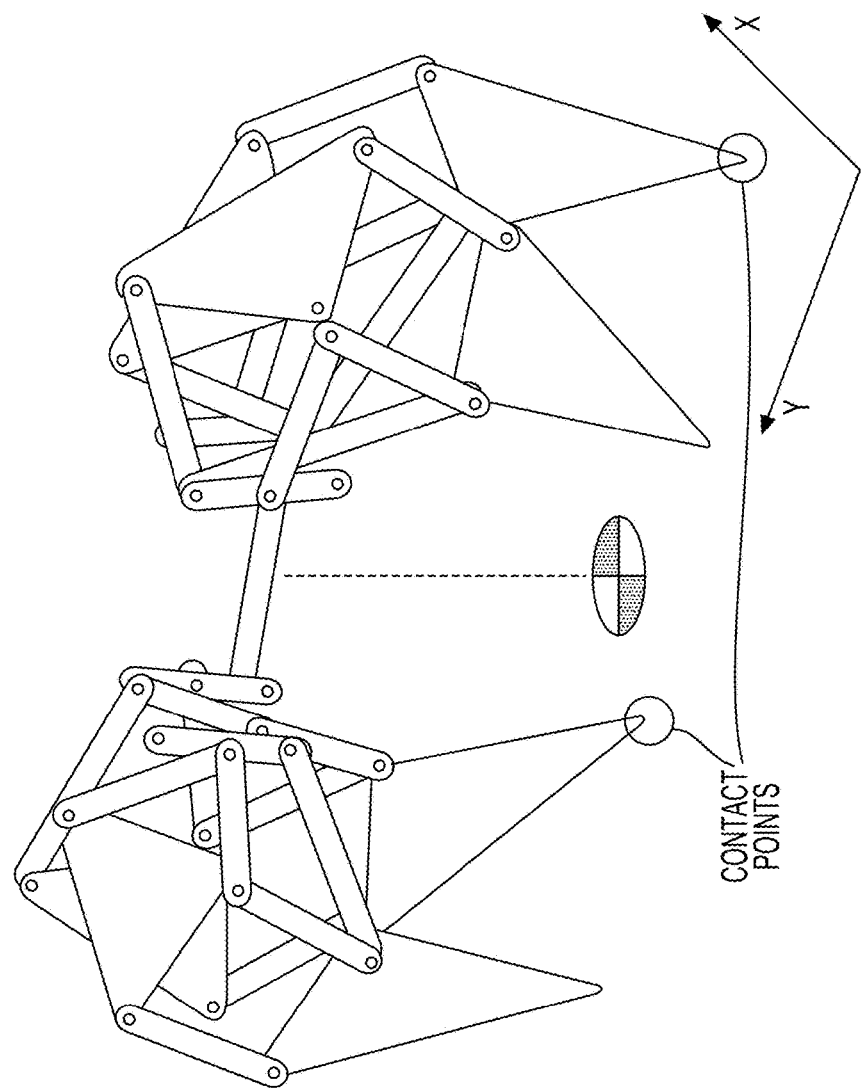
FIG. 8 is a graphical user interface depicting an example of a robotic model, according to an embodiment of the present disclosure.
Figure 9:
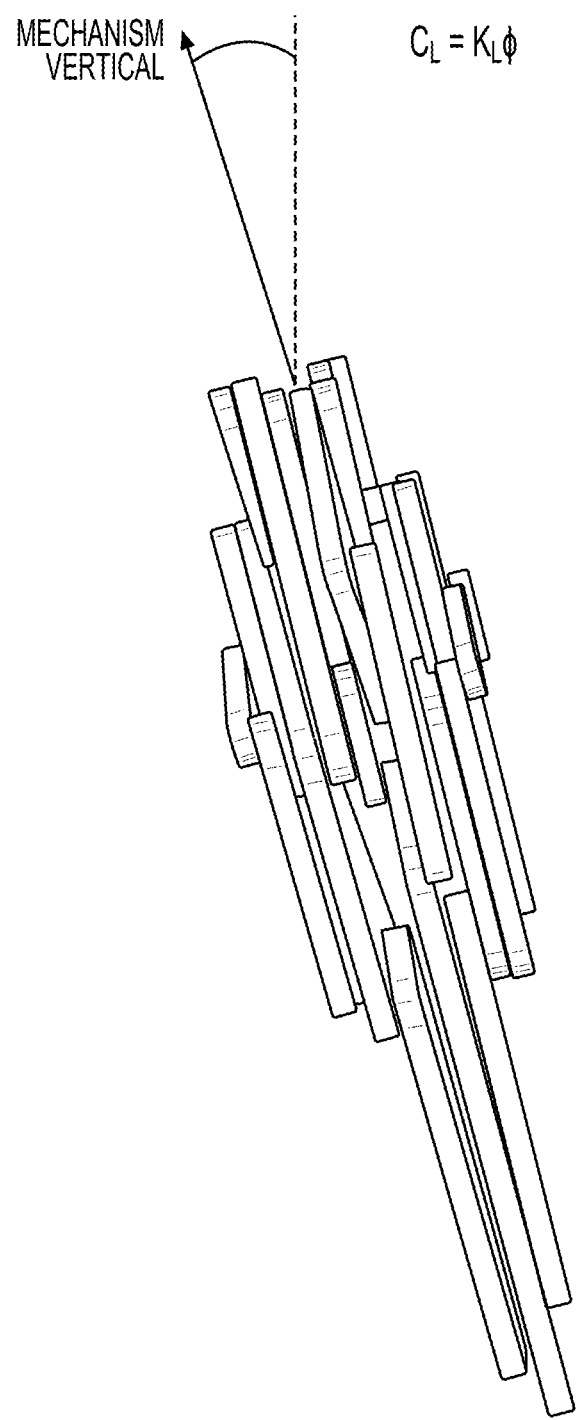
FIG. 9 is a graphical user interface depicting an example of a robotic model, according to an embodiment of the present disclosure.

In FIG. 7, the center link may articulate to allow for stabilization and steering. At any given point in time, only a single point of contact is made between each set of legs and the ground. As such, the system is not statically stable, and must be actively stabilized. This may be accomplished using the center articulated joint. For the system to maintain stability, the combined center of mass of the entire system may be placed over the line of contact defined by the two points making contact with the ground. To calculate the control effort, the contact points for each pair of legs may be determined. As an initial estimation, the vertical position of a coordinate frame attached to the point of each leg may be compared, and the leg with the lower position is assumed to be the leg contacting the ground. The center of mass of the system may then be calculated based on the current payload, its position, and the positioning of each leg joint. This point may then be projected onto a horizontal plane passing through the line of contact, and the necessary correction may be calculated based on the distance of this projected point to the line of contact, and a configurable gain. This approach is illustrated in FIG. 8 where FIG. 8 depicts a general formulation of the center of mass control system. In some embodiments the leg mechanisms and actuation systems may be integrated into the construction of a shipping container as is discussed in further detail below.

In some embodiments, the vector that is perpendicular to the line of contact, denoted can be calculated as the normalized vector:

$$\hat{v} = \frac{\left\{\begin{array}{c} y_f - y_r \\ -x_f - x_r \end{array}\right\}}{\left\|\left\{\begin{array}{c} y_f - y_r \\ -x_f - x_r \end{array}\right\}\right\|}$$

A second vector, l connects the rear contact point and the projected COM, and can be defined as:

$$\ell = \left\{\begin{array}{c} x_r - x_c \\ y_r - y_c \end{array}\right\}$$

The distance between the projected center of mass and the line of contact can be calculated as the projection of l onto $$r = l \cdot \hat{v}$$

And the center of mass control effort (that is, the desired position of the central joint) calculated as:

$$c_m = k_m r$$

Figure 10:
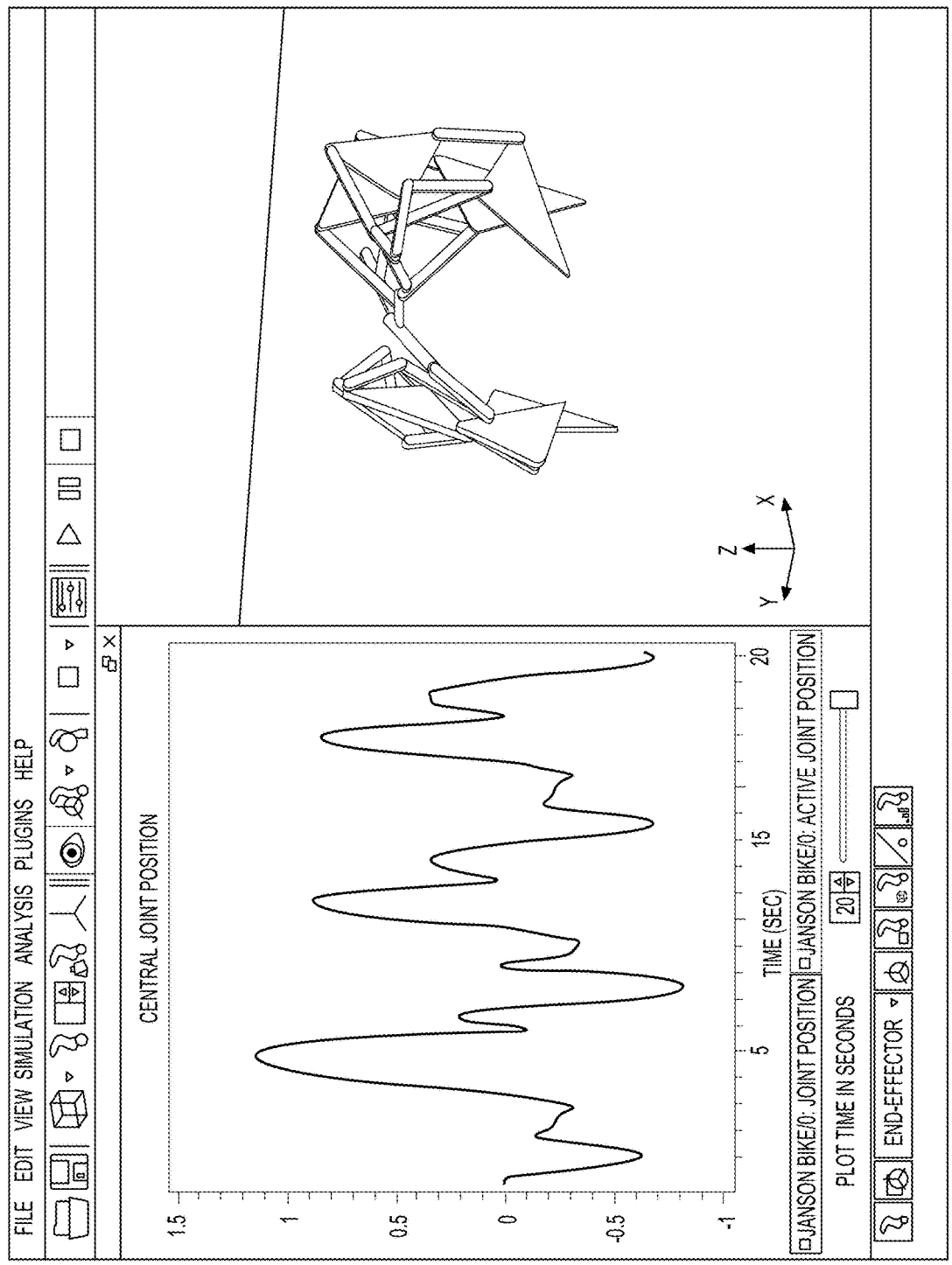
FIG. 10 is a graphical user interface depicting an example of a robotic model, according to an embodiment of the present disclosure.

This control effort alone, however, may not be sufficient to retain the system in an upright posture. Instead, it will tend to progress to a side-leaning posture, which becomes more extreme over time. Eventually, the system may reach the limit of central joint articulation, and become unstable. An additional control effort may be needed to restore the system to an upright pose. This control effort may be based on the orientation of the central link (measured about the global horizontal) and a second configurable gain, as illustrated in FIG. 10. FIG. 10 shows an example of a mechanism lean control formulation. In this example, the mechanism vertical may be a coordinate frame rigidly attached to the axis of the central joint of the mechanism. Here, kL may be a user configurable proportional gain that can be adjusted to provide the desired response. The overall control action (defined as the desired position of the center articulated joint, θd) is then calculated as;

$$\theta_d = C_L + C_m = k_L \phi + k_m r$$

Figure 11:
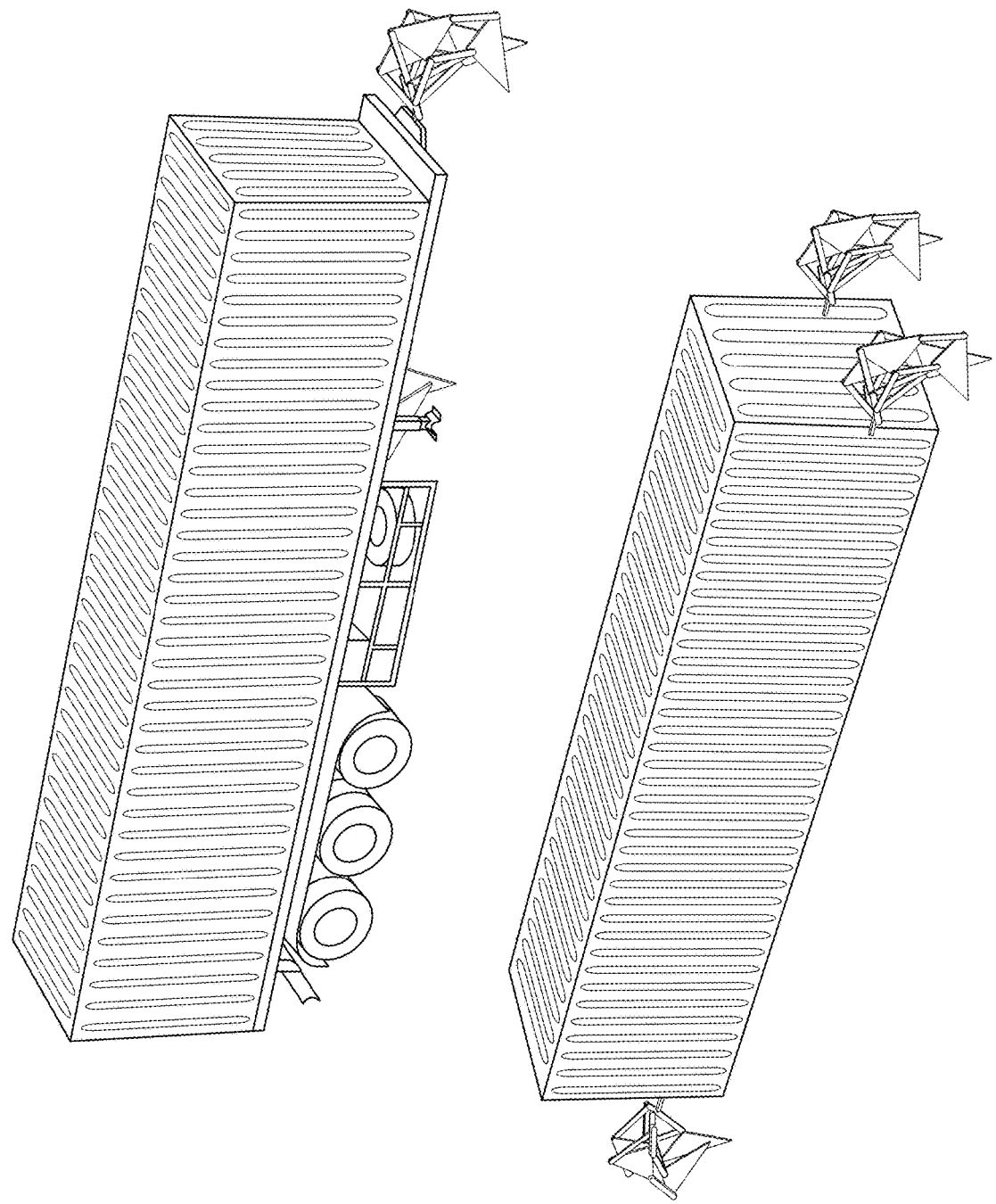
FIG. 11 is a diagram of a two example drive configurations for a walking mechanism-based transport system, according to an embodiment of the present disclosure.

An initial study of this control approach has proven it is capable of retaining the system in an upright and stable position during forward movement. However, the two gains have significant interaction, and tuning is difficult. To address these, embodiments of robotic optimization process 10 may apply the randomizing optimizing framework to this system to tune the gains to their most stable configuration. The resultant gains, when applied to the system, result in a stable walking motion. FIG. 11 shows a graphical user interface depicting an example manipulator configuration and a plot of the central joint position for the planar Jensen mechanism example over time.

Figure 12:
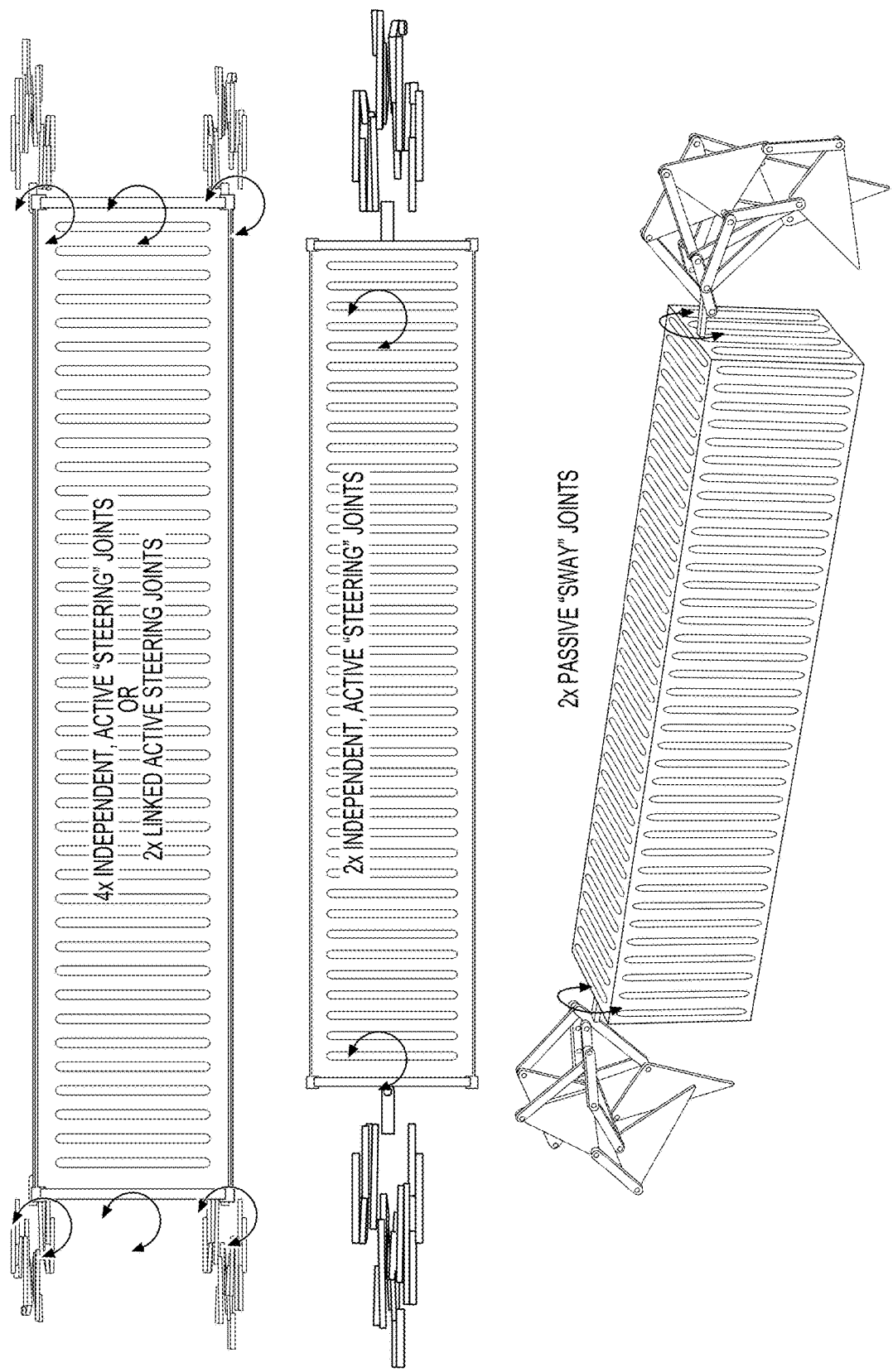
FIG. 12 is a diagram of an example joint configuration for a walking mechanism-based transport system, according to an embodiment of the present disclosure.

Referring now to FIGS. 12-13, examples of vehicles that may be used in accordance with robotic optimization process 10 are provided. Embodiments included herein may be used within the domain of material transport and design across uneven or unstable terrain. As an example, embodiments included herein may be used for the transport of standardized International Standards Organization ("ISO") shipping containers. Currently, these containers are moved via tractor-trailer systems, rail, sea and air. However, the ability to deliver these containers to isolated regions with little in the way of established infrastructure presents a significant challenge. Rocky, sandy and muddy terrain present particular challenges, and often require delivery (at great expense) by helicopter. Wheeled vehicles cannot reliably traverse these types of terrain, and frequently become stuck. Accordingly, embodiments included herein may utilize one or more walking mechanism-based transport system approaches. FIGS. 12-13 show several conceptual models of a system driven by one or more walking-based mechanisms. These systems might be based on a combination of both legs and wheels, or on legs alone, as illustrated below. FIG. 12 depicts two potential drive configurations for a walking mechanism-based transport system. Combining a traditional wheeled trailer with a leg-based drive mechanism (shown on the left) enables more universal applicability and a more conceptually straightforward system. A system with four leg mechanisms provides greater terrain crossing capability and more range of motion. In some embodiments, the attachment of the leg mechanism to the cargo container might constrain the system rigidly, allow passive sway motion, or both passive sway and driven steering motion. The specific configuration of the system may be dependent on the type of terrain to be traversed, and the cargo being carried. FIG. 13 depicts example joint configurations for the transport system. In some embodiments, steering joints may be either linked (providing a simpler system), or independent (providing greater range of motion). The addition of a passive sway joint may allow the cargo to remain closer to level at all times, but may not be appropriate for dynamic payloads such as liquids.

In addition to those described above, embodiments of robotic optimization process 10 may be used in a variety of applications. Some applications may include, but are not limited to, the transportation of ISO containers, the transportation of palletized cargo, the transportation of individuals who are injured, ill or otherwise disabled, or any other suitable application. One example of a randomized multi-optimization may include legged robot that needs to traverse rocky terrain. A metric on performance (e.g., the objective function) could include the average time to traverse 50 m across a field of rocks. Variables used in optimization could include a ratio of thigh to shin length for the robot's legs (e.g., for a fixed robot height), and a ratio of large to small rock size in the field. In this particular example, two optimizations may be repeatedly performed, first the leg ratio may be optimized to minimize the average traversal time, and second the rock ratio may be optimized to maximize the average traversal time. The result of this simulation would be a design for robot legs that performed best in the worst-case terrain. Another example could be a vision system for a mobile bin-picking robot, where the metric on performance is the percentage of parts that may be picked from a bin. The variable used in optimization may include 1) a contrast setting on a camera 2) three values of a 3D vector giving light placement with respect to the bin holding the parts, 3) the color of the light, and/or 4) a measure of shininess of the parts. In this example, two optimizations would be repeatedly performed, first the variables in 1)-3) may be optimized to maximize the percentage of parts picked. Second, the shininess may be optimized to minimize the percentage of parts picked. The end result may include contrast and light settings that give the best performance for the worst-case set of parts. Yet another example may include a remote-controlled walking robot that operates inside a factory, where there may be two metrics on performance: A) minimum average time completion of a task, B) minimum probability of falling down. The variables used in optimization may include 1) a parameterization of pilot model, 2) motor power and gearing, 3) obstacle distribution. In this example, three optimizations may be repeatedly performed, first the variables in set 1) may be optimized to minimize metric A (completion time). Then, the variables in set 2) may be optimized to minimize metric B (probability of falling down). Then, the variables in set 3) may be optimized to maximize metric B (probability of falling down). The result may include motor and gear sizes that minimize the probability of falling down when the pilot was trying to run as fast as possible.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may, but not always, represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A robotic system, comprising:
   a transportation mechanism having at least three legs;
   a computing device configured to receive a plurality of optimization components each including a plurality of variables, wherein the computing device is further configured to perform a randomized simulation based upon, at least in part, each of the plurality of optimization components and to provide one or more results of the randomized simulation to the transportation mechanism to enable locomotion via the at least three legs.

2. The robotic system of claim 1, wherein the randomized simulation is performed prior to locomotion of the transportation mechanism.

3. The robotic system of claim 1, wherein the randomized simulation is performed during locomotion of the transportation mechanism.

4. The robotic system of claim 1, wherein the at least three legs are configured to contact the ground along a single line.

5. The robotic system of claim 1, wherein the at least three legs include at least one of a Klann linkage and a Jansen linkage.

6. The robotic system of claim 1, wherein the computing device includes a control system that is optimized in real-time based on terrain information that is known a priori or sensed in real time.

7. The robotic system of claim 1, wherein the computing device includes a quantum computer configured to perform at least a portion of the randomized simulation.

8. The robotic system of claim 1, wherein locomotion includes a walking-style gait controlled by a single degree of freedom shared between two or more of the at least three legs.

9. The robotic system of claim 1, wherein the computing device is configured to control balance of the transportation mechanism using an actively actuated hydraulic, pneumatic or electromechanical control system.

10. The robotic system of claim 1, wherein the transportation mechanism is selected from a vehicle, a legged robot, or a mobile robot.

11. A robotic method, comprising:
providing a transportation mechanism having at least three legs;
receiving, at a computing device, a plurality of optimization components each including a plurality of variables;
performing, using the computing device, a randomized simulation based upon, at least in part, each of the plurality of optimization components; and
providing one or more results of the randomized simulation to the transportation mechanism to enable locomotion via the at least three legs.

12. The robotic method of claim 11, wherein the randomized simulation is performed prior to locomotion of the transportation mechanism.

13. The robotic method of claim 11, wherein the randomized simulation is performed during locomotion of the transportation mechanism.

14. The robotic method of claim 11, wherein the at least three legs are configured to contact the ground along a single line.

15. The robotic method of claim 11, wherein the at least three legs include at least one of a Klann linkage and a Jansen linkage.

16. The robotic method of claim 11, further comprising:
optimizing a control system in real-time based on terrain information that is known a priori or sensed in real-time.

17. The robotic method of claim 11, further comprising:
performing at least a portion of the randomized simulation using a quantum computer.

18. The robotic method of claim 11, wherein locomotion includes a walking-style gait controlled by a single degree of freedom shared between two or more of the at least three legs.

19. The robotic method of claim 11, further comprising:
balancing the transportation mechanism using an actively actuated hydraulic, pneumatic or electromechanical control system.

20. The robotic method of claim 11, wherein the transportation mechanism is selected from a vehicle, a legged robot, or a mobile robot.

21. The robotic method of claim 11, wherein the transportation mechanism includes, at least in part, a mobile bin-picking robot.

* * * * *